United States Patent
Calvel et al.

(10) Patent No.: US 10,618,237 B2
(45) Date of Patent: Apr. 14, 2020

(54) MATRIX ELEMENT FOR TIRE MOULD AND ASSOCIATED MANUFACTURING METHOD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Romain Calvel, Clermont-Ferrand (FR); Thibault Boncompagne, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 392 days.

(21) Appl. No.: 15/542,283

(22) PCT Filed: Jan. 8, 2016

(86) PCT No.: PCT/EP2016/050263
§ 371 (c)(1),
(2) Date: Jul. 7, 2017

(87) PCT Pub. No.: WO2016/110562
PCT Pub. Date: Jul. 14, 2016

(65) Prior Publication Data
US 2018/0297305 A1    Oct. 18, 2018

(30) Foreign Application Priority Data
Jan. 8, 2015  (FR) ...................... 15 50134

(51) Int. Cl.
*B29D 30/06* (2006.01)
*B29D 30/66* (2006.01)
(Continued)

(52) U.S. Cl.
CPC ........ *B29D 30/0606* (2013.01); *B22F 3/1055* (2013.01); *B22F 5/007* (2013.01);
(Continued)

(58) Field of Classification Search
CPC ...... B29D 2030/0617; B29D 2030/061; B29D 30/0629
See application file for complete search history.

(56) References Cited

U.S. PATENT DOCUMENTS 5,059,380 A    10/1991   Wise et al.
5,939,101 A *  8/1999    Green .................... B29C 33/10
                                                     249/141

FOREIGN PATENT DOCUMENTS

EP    2 689 920    1/2014
FR    2 763 892    12/1998
(Continued)

*Primary Examiner* — Peter L Vajda
*Assistant Examiner* — Asha A Thomas
(74) *Attorney, Agent, or Firm* — Cozen O'Connor

(57) ABSTRACT

The liming element for a tire mould comprises a body 12 delimiting a moulding surface 14 intended to at least partially mould a rolling surface of the tire, at least one injection nozzle 26 arranged on the body and provided with at least one outlet orifice 26a, at least one supply duct extending inside the body and the injection nozzle while being in communication with the said outlet orifice, and at least one shut-off member 30 mobile with respect to the injection nozzle between an outlet orifice closed position and an outlet orifice open position. The body 12, the injection nozzle 26 and the shut-off member 30 are manufactured by the deposition and selective melting of stacked layers of powder.

18 Claims, 4 Drawing Sheets

(51) Int. Cl.
- *B33Y 80/00* (2015.01)
- *B22F 3/105* (2006.01)
- *B22F 5/00* (2006.01)
- *B29C 33/38* (2006.01)
- *B33Y 10/00* (2015.01)

(52) U.S. Cl.
CPC ...... *B29C 33/3842* (2013.01); *B29D 30/0678* (2013.01); *B29D 30/66* (2013.01); *B33Y 80/00* (2014.12); *B22F 2005/005* (2013.01); *B29D 2030/061* (2013.01); *B29D 2030/0613* (2013.01); *B29D 2030/0614* (2013.01); *B29D 2030/0617* (2013.01); *B33Y 10/00* (2014.12); *Y02P 10/292* (2015.11); *Y02P 10/295* (2015.11)

(56) References Cited

FOREIGN PATENT DOCUMENTS

| | | |
|---|---|---|
| FR | 2 881 680 | 8/2006 |
| FR | 2 961 741 | 12/2011 |
| FR | 2 996 798 | 4/2014 |
| JP | 2011 031452 | 2/2011 |
| KR | 2002 0003020 | 1/2002 |
| WO | WO 00/23238 | 4/2000 |
| WO | WO 2012/156439 | 11/2012 |
| WO | WO 2014/199550 | 12/2014 |

\* cited by examiner

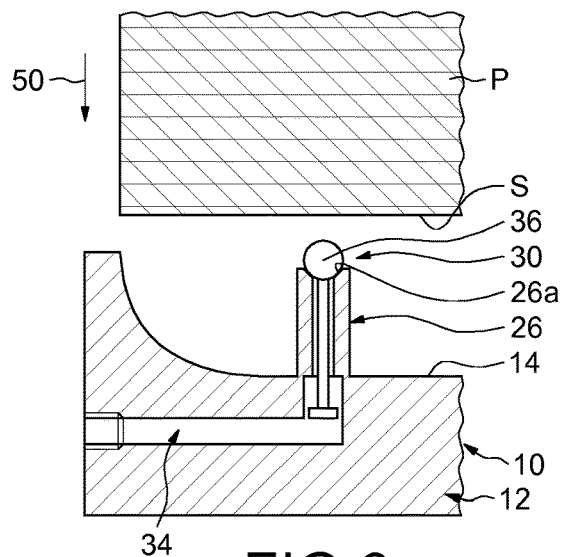
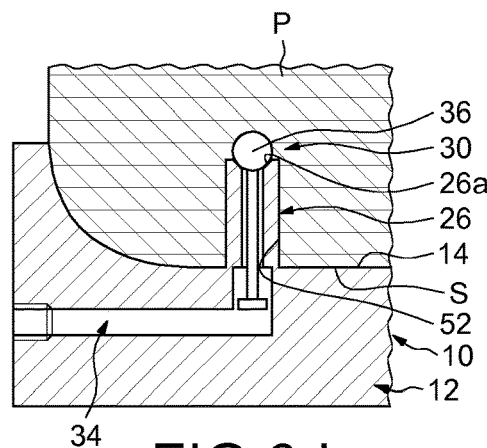
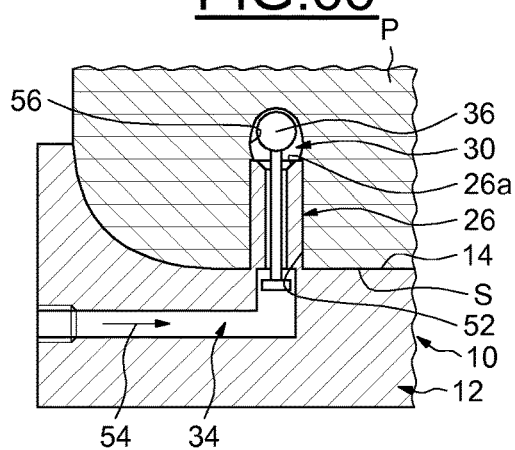
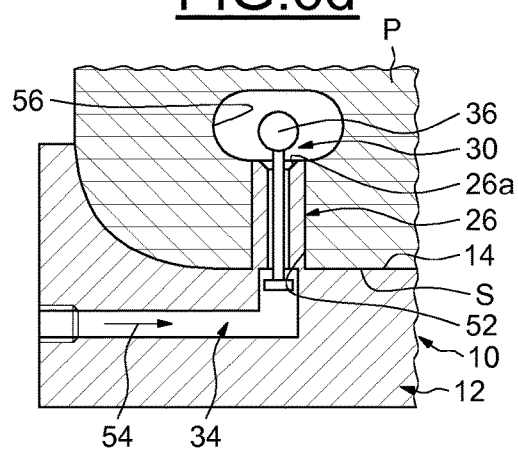
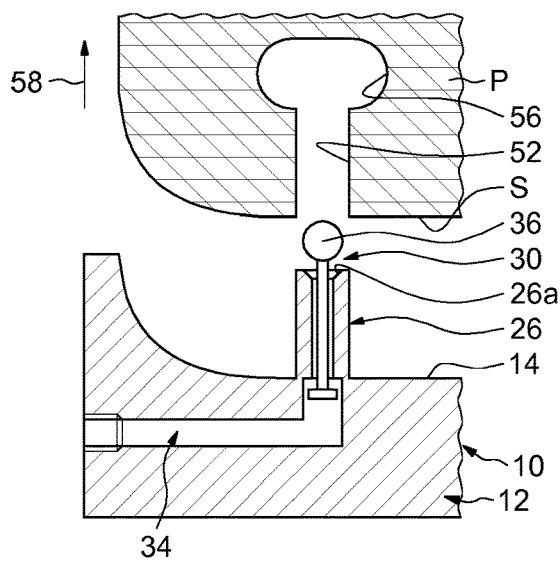

MATRIX ELEMENT FOR TIRE MOULD AND ASSOCIATED MANUFACTURING METHOD

RELATED APPLICATIONS

This is a U.S. National Phase Application under 35 USC 371 of International Application PCT/EP2016/050263 filed on Jan. 8, 2016.

This application claims the priority of French application no. 1550134 filed Jan. 8, 2015, the entire content of which is hereby incorporated by reference.

FIELD OF THE INVENTION

The present invention relates to a lining element obtained by powder-based additive manufacture and comprising means for injecting a fluid or a solid. The lining element is intended to be used in a curing or vulcanizing mould for a vehicle tire, and notably in a mould of the segmented type. The present invention also relates to a method for obtaining such a lining element.

BACKGROUND OF THE INVENTION

A segmented mould chiefly comprises two lateral shells each of which moulds one of the lateral sidewalls of the tire, and a plurality of segments that mould the rolling of the said tire and that are radially mobile between a mould open and a mould closed position. The shells and the segments define an interior space intended to be brought into contact with the non-vulcanized green tire.

In order to mould the tread of the tire, the segments of the mould comprise lining elements. What is meant by a "lining element" is a part of the mould which comprises a moulding surface that allows at least part of the tread surface of this tread to be moulded.

It is possible to create a lining element by a powder-based additive manufacturing method by sintering or melting particles of the said powder using a beam of energy. What is meant by a "beam of energy" is an electromagnetic radiation (for example a laser beam) or a beam of particles (for example an electron beam).

The benefit of manufacturing using selective melting of superposed layers of powder, more commonly referred to as sintering, lies chiefly in the fact that the shape of these lining elements can be computer-modelled and that the lining elements can then be manufactured on the basis of this modelling by having the computer direct the beam of energy. When the selective melting is performed using a laser beam, it is called laser sintering. The laser sintering technique consists in manufacturing the component layer after layer, stacking the layers of powder which are consolidated and melted one after another by the laser beam in a direction of stacking.

Patent application WO-A1-2012/156439 describes a particular lining element obtained in part using this laser sintering technique. The lining element is made up of a sintered moulding part for moulding the tread of the tire, and of a non-sintered support base secured to the moulding part and forming an interface with the associated mould. The sintered moulding part comprises bars and sipe blades for forming the tire tread patterns.

In a way known per se, the patterns of the tread of the tire play a key role in the grip of this tire, chiefly when driving on wet and/or snowy ground.

In order to maintain over the course of time a tire that has good grip and water-drainage performance, it is known practice to provide, for the tread of the tire, tread patterns that evolve with tire wear. To do that, cavities are formed beneath the tread surface of the tread when the tire is new and are intended after partial wear to form a new tread pattern the characteristics of which are tailored to suit the reduced thickness of the tread. For further details regarding such evolving tread patterns, reference may for example be made to patent application FR-A1-2 763 892.

In that anterior document, in order to succeed in moulding cavities beneath the tread surface of the tread, the associated curing mould comprises a plurality of fingers attached to each lateral shell and projecting with respect to the moulding surface of the said shell.

In order to be able to demould the tire, it is necessary to produce each lateral shell in two parts and to provide between these means of connection that allow the part supporting the fingers to rotate with respect to the other part. This appreciably increases the cost of manufacture of the mould. Furthermore, the fixing of the fingers to the lateral shells does not allow cavities to be moulded into all the desired regions of the tire tread.

An alternative solution for succeeding in moulding tread patterns that evolve according to the degree of tire wear is to fix to the segments of the associated curing mould sipe blades which are shaped in such a way as to obtain tear-drop shaped cuts in the tire tread. FIG. 6 of document FR-A1-2 961 741 discloses such a sipe blade which is obtained by laser sintering. Specifically, this technique is well suited to the manufacture of small-sized elements of complex shapes, such as these sipe blades, which are difficult to manufacture by other methods.

However, in order to obtain cuts of the teardrop type, such sipe blades comprise a main body of relatively small cross section. The sipe blades may suffer deformations and/or damage during the course of manufacture that may cause stress concentrations and micro cracks to appear.

SUMMARY OF THE INVENTION

One object of the present invention is to provide a simple and robust solution that makes it possible to mould evolving tread patterns in the tread of a tire.

One aspect of the invention relates to a lining element for a tire mould comprising a body delimiting a moulding surface intended to at least partially mould a rolling surface of the tire. The lining element further comprises at least one injection nozzle arranged on the body and provided with at least one outlet orifice. The lining element also comprises at least one supply duct extending inside the body and the injection nozzle while being in communication with the said outlet orifice. The lining element further comprises at least one shut-off member mobile with respect to the injection nozzle between an outlet orifice closed position and an outlet orifice open position. The body, the injection nozzle and the shut-off member are manufactured by the deposition and selective melting of stacked layers of powder.

What is meant by a "mould" is a collection of separate elements which, when brought closer together, are able to delimit an interior moulding space.

What is meant by a "rolling surface" of a tire is the surface of the tread intended to come into contact with the roadway when the tire is being driven on.

What is meant by "lining element" is a part of the mould that is intended to allow all or some of the rolling surface of the tire to be moulded.

What is meant by "powder" is a powder or a mixture of powders. The powder may for example be a metallic, plastic or inorganic powder, for example a ceramic powder.

The lining element makes it possible to obtain a moulding of evolving tread patterns in the tread of the tire in a way that is simple and robust. Specifically, the injection nozzle allows material (fluid or solid) to be injected during the step of the moulding of the tire inside the associated mould, thereby making it possible to create a cavity formed beneath the rolling surface of the tire. The shut-off member makes it possible to prevent rubber from the green tire from entering the injection nozzle prior to injection. This then prevents the rubber from creeping into the supply duct. The body, the injection nozzle and the shut-off member of the lining element are manufactured at the same time during the operations of deposition and selective melting of stacked layers of powder.

In one preferred embodiment, the injection nozzle is made in one with the body and projects out with respect to the moulding surface of the said body. What is meant by an injection nozzle "formed as one" with the body is an injection nozzle that is produced as one piece with the body.

Alternatively, the injection nozzle may be mounted mobile on the body between a retracted position inside the said body and a deployed position in which it projects out with respect to the moulding surface of the said body.

For preference, the shut-off member is mobile from the closed position to the open position under the effect of the pressure of a fluid or of a solid introduced into the supply duct. This then gives a shut-off member that is configured to allow the transition from the closed position to the open position only under the effect of the pressure of the injected material (fluid or solid). There is therefore no need to provide special-purpose means for making the shut-off member move. Furthermore, the pressure of the green tire introduced into the mould allows the shut-off member to be kept in the closed position as long as no material is being injected. The shut-off member is mounted with the ability to move freely with respect to the injection nozzle.

The outlet orifice may advantageously open onto a frontal surface of the injection nozzle substantially parallel to the moulding surface of the body.

Advantageously, the supply duct comprises means of connection to a supply source which is external to the lining element.

In one embodiment, the shut-off member is mobile in translation with respect to the injection nozzle. The shut-off member may comprise a piston provided with a rod mounted inside the supply duct and with a shut-off head able to shut off the said outlet orifice in the closed position.

Alternatively, the shut-off member may be rotationally mobile with respect to the injection nozzle. The shut-off member may comprise a flap that comes to bear against the frontal surface of the injection nozzle in the closed position. The flap may be mounted with the ability to rotate by means of a hinge arranged on the nozzle.

For preference, the body comprises venting means extending from the moulding surface and intended to allow air to be evacuated while the tire is being moulded. The venting means are in communication with the supply duct. Thus, the venting means provided for preventing air from becoming trapped between the moulding surface and the green tire during the tire vulcanizing step are also used to inject this air through the injection nozzle. These venting means therefore have a dual function.

For preference, the lining element also comprises a plurality of protuberances extending out from the moulding surface of the body and intended to mould oucuts in the tread of the tire.

What is meant by "outcuts" in the tread is the space delimited by walls of material extending from the rolling surface, facing one another and distant from one another by a non-zero distance. The cavity or cavities formed by injection may be offset towards the inside of the tire with respect to the cuts.

The protuberances may for example be bars and/or sipe blades intended respectively to form grooves and/or sipes in the tread of the tire.

In one embodiment, the injection nozzle extends out from the moulding surface of the body. Alternatively, the nozzle may extend out from a free frontal surface of one of the protuberances, for example of one of the bars.

For preference, the outlet orifice of the injection nozzle is offset on the side opposite to the body with respect to the protuberances.

The invention also relates to a mould for a tire of the type comprising a tread and two lateral sidewalls. The mould comprises first and second shells which are intended to mould the lateral sidewalls of the tire, and a plurality of segments distributed in the circumferential direction and intended to mould the tread of the said tire. Each segment comprises at least one lining element as defined hereinabove.

The invention also relates to a method of manufacturing at least one lining element, the lining element comprising a body delimiting a moulding surface intended to at least partially mould a rolling surface of the tire, the method comprising the following steps:

a) the manufacture, by deposition and selective melting of stacked layers of powder, of the body of the lining element, of at least one injection nozzle arranged on the said body and provided with at least one outlet orifice, and of a shut-off member for shutting off the said outlet orifice, the injection nozzle being rendered as one with the body and the shut-off member being rendered as one with at least the said nozzle during the steps of selective melting of the layers of powder, b) at least partial formation of at least one supply duct extending inside the body and the injection nozzle and being in communication with the outlet orifice of the said nozzle during the steps of deposition and selective melting of the layers of powder, and c) partial separation of the shut-off member and of the injection nozzle after the steps of deposition and selective melting of the layers of powder so as to give the shut-off member mobility between positions in which the outlet orifice of the injection nozzle is closed and open.

In one embodiment, according to a modelled melting of the layers of powder, a clearance is provided between part of the shut-off member and a facing part of the injection nozzle, which clearance is comprised between 0.05 and 0.5 mm and preferably equal to 0.1 mm, so that the deposited powder present between the said facing parts is completely or partially melted by the diffusion of heat locally rendering the shut-off member and the injection nozzle as one.

According to one embodiment in which the shut-off member comprises a piston provided with a rod mounted inside the supply duct and with a shut-off head, the body of the lining element is manufactured in such a way as to extend in an inclined fashion with respect to a build platform on which a first layer of powder is deposited and melted.

Another aspect of the invention also relates to a method of moulding a tire using a mould comprising first and second shells intended to mould the lateral sidewalls of the tire, and a plurality of segments distributed in the circumferential direction and intended to mould the tread of the said tire, in which method the non-vulcanized green tire that is to be moulded is brought into contact with the shells and the segments of the mould, the green tire is heated, and then a fluid or a solid is injected under the exterior surface of the green tire which is in contact with the mould and which is intended to form the rolling surface of the tire so as to create at least one cavity in the thickness of the said green tire and beneath the said rolling surface.

BRIEF DESCRIPTION OF THE DRAWINGS

The present invention will be better understood from reading the detailed description of some embodiments taken by way of entirely nonlimiting examples and illustrated by the attached drawings in which:

DETAILED DESCRIPTION OF THE DRAWINGS

Figure 1:
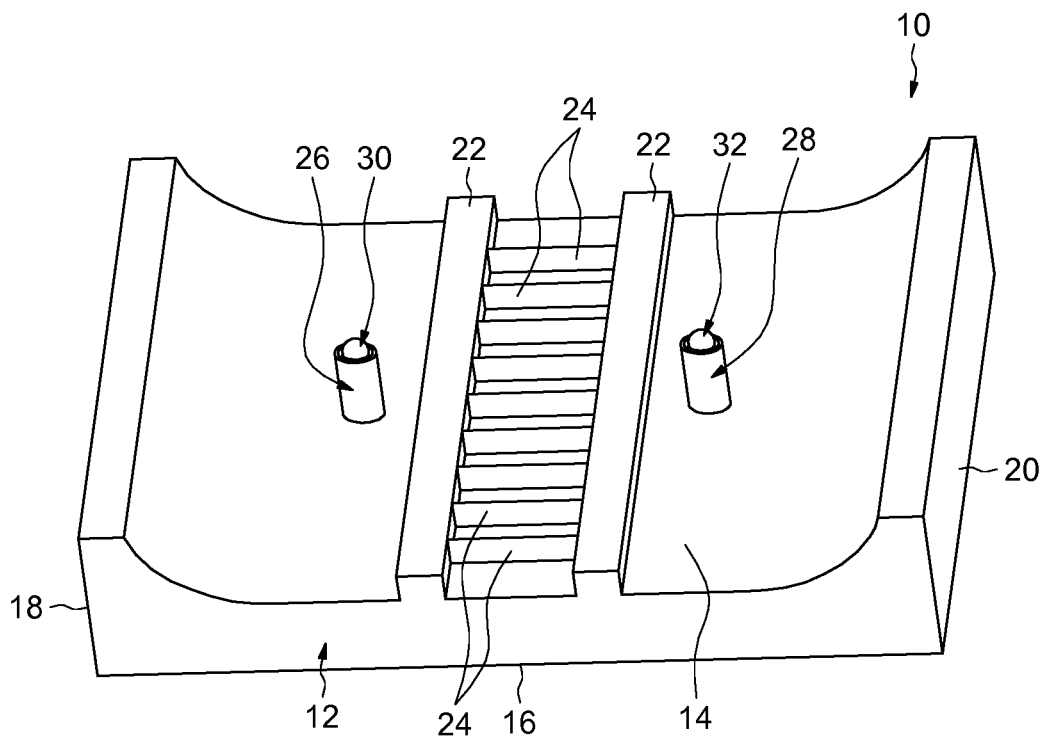
Figure 2:
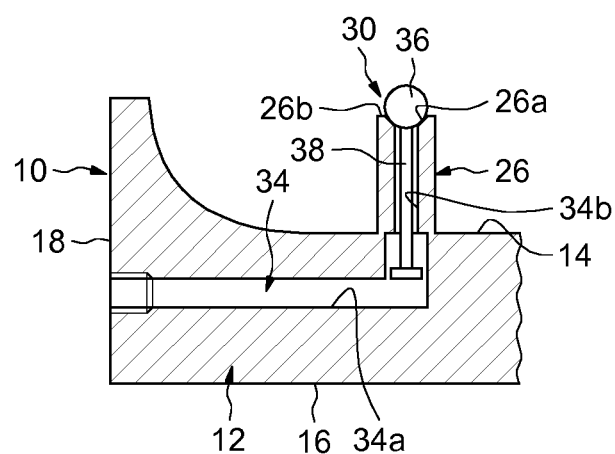
Figure 3:
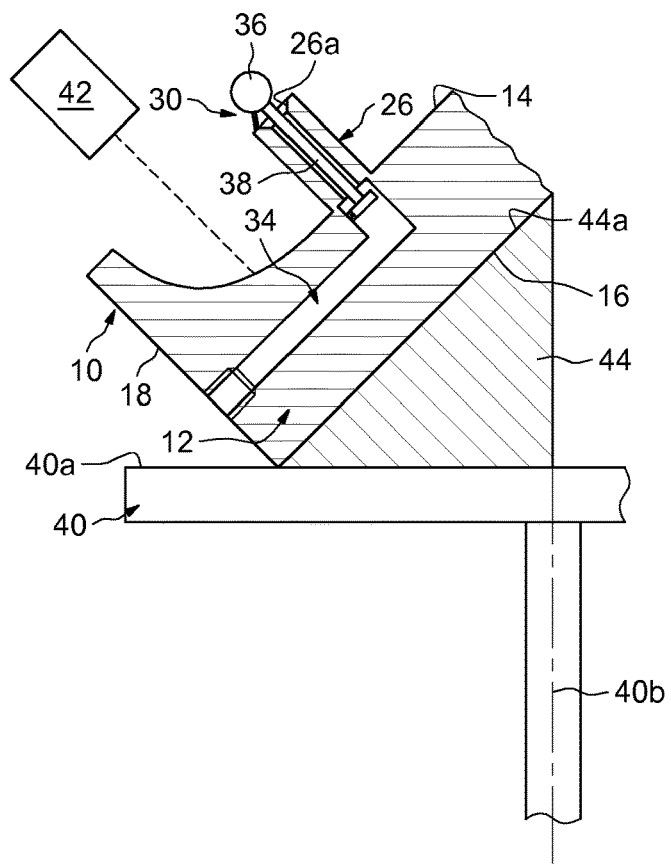
Figure 4:
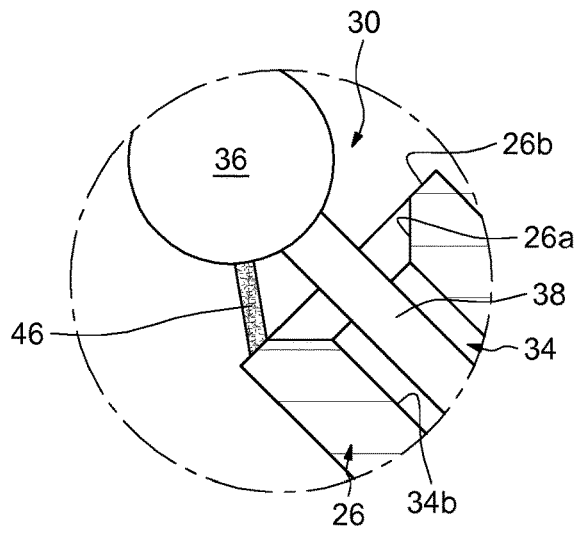
Figure 5:
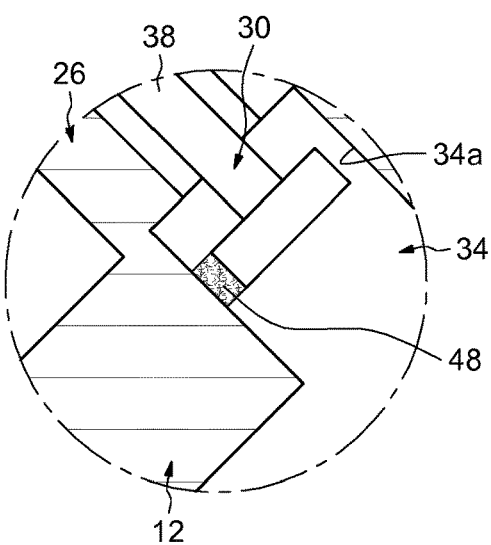

FIG. 1 is a schematic perspective view of a lining element according to a first embodiment, FIG. 2 is a partial view in cross section of the lining element of FIG. 1, FIG. 3 is a schematic view in cross section partially illustrating a method of manufacturing the lining element of FIG. 1 by laser sintering according to a first embodiment, FIGS. 4 and 5 are views of detail of FIG. 3, FIGS. 6a to 6e are partial views in cross section illustrating a method of moulding a tire using the lining element of FIG. 1, and FIGS. 7 to 9 are partial views in cross section of lining elements according to second, third and fourth embodiments.

FIG. 1 depicts a lining element, referenced 10 overall, used in a curing or vulcanizing mould for a vehicle tire. As will be described in greater detail later on, the lining element 10 is manufactured by deposition and selective melting of stacked layers of powder.

The lining element 10 comprises a body 12 which is delimited by a first surface 14 and by a second surface 16 opposite the first surface. The first surface 14 forms a moulding surface intended to mould all or part of the rolling surface of the tire. The second surface 16 is intended to be in contact with another part of the curing mould to which the lining element 10 is attached. The second surface 16 forms a surface for anchoring the lining element 10 onto the said other part of the curing mould. In the case of a mould of the segmented type, the lining element 10 is fixed to one of the segments of the mould. The first and second surfaces 14, 16 delimit the thickness of the body 12. The body 12 also comprises two opposite lateral surfaces 18, 20 delimiting the second surface 16.

The lining element 10 also comprises a plurality of protuberances 22, 24 extending out from the moulding surface 14. The protuberances 22 constitute bars intended to mould grooves in the tread of the tire. What is meant by bars is a protuberance the width of which is greater than or equal to 2 mm. The protuberances 24 constitute sipe blades intended to mould sipes in the tread of the tire. What is meant by sipe blades is a protuberance the width of which is less than 2 mm. In the embodiment illustrated, the protuberances 24 that form sipe blades extend perpendicular to the protuberances 22 that form bars. The protuberances 22, 24 are formed as one with the body 12.

The lining element 10 also comprises two injection nozzles 26, 28 projecting out with respect to the moulding surface 14 of the body, and two shut-off members 30, 32 each one associated with one of the nozzles. The nozzles 26, 28 are arranged laterally on each side of the protuberances 22, 24. The layout and number of nozzles 22, 24 indicated here in the embodiment illustrated are not in any way limiting. Because the nozzles 26, 28 and the shut-off members 30, 32 are respectively identical here, just one of them will be described.

The injection nozzle 26 extends from the moulding surface 14 of the body. The injection nozzle 26 here extends transversely to the moulding surface 14. The injection nozzle 26 is formed as one with the body 12. In the embodiment illustrated, the injection nozzle 26 has a tubular overall shape. In the embodiment illustrated, the nozzle 26 extends beyond the protuberances 22, 24.

As illustrated more visibly in FIG. 2, the injection nozzle 26 comprises an outlet orifice 26a. The said orifice opens onto a frontal end surface 26b of the nozzle which is situated on the opposite side to the moulding surface 14 of the body. The said frontal surface 26b is parallel to the moulding surface 14.

The lining element 10 also comprises a supply duct 34 extending inside the body 12 and the injection nozzle 26. The duct 34 opens into the outlet orifice 26a of the nozzle. The duct 34 extends into the thickness of the body 12 and extends longitudinally inside the injection nozzle 26. In the embodiment illustrated, the duct 34 extends from the lateral surface 18 of the body. The duct 34 here comprises a large-diameter cylindrical portion 34a extending from the lateral surface 18 into the thickness of the body 12 and which is extended by a small-diameter cylindrical portion 34b extending along the injection nozzle 26. The duct 34 allows for connection to an exterior supply source (not depicted) for the injection of a fluid or a solid. In this regard, the part of the duct 34 that opens onto the lateral surface 18 of the body comprises a screw thread for making this connection. In the embodiment illustrated, a supply duct 34 is specific to each nozzle 26. Alternatively, it is possible to provide a supply duct that is common to all of the nozzles.

The shut-off member 30 here takes the form of a piston provided with a shut-off head 36 and with a head supporting rod 38. The head 36 is intended to come and shut off the outlet orifice 26a of the nozzle. The head 36 is situated outside of the said nozzle. The rod 38 extends inside the supply duct 34. As will be described in greater detail later on, the shut-off member 30 is mobile in translation with respect to the injection nozzle 26 and to the body 12. The shut-off member 30 is mobile between a position in which the nozzle outlet orifice 26a is closed as illustrated in FIG. 2 and a position in which the said orifice is open. In the closed position, the head 36 of the shut-off member covers the outlet orifice 26a. In the open position, the head 36 is situated some distance away from the orifice 26a.

FIG. 3 illustrates a step in the method of manufacturing the lining element 10. This method comprises a plurality of successive steps of depositing layers of powder and of agglomerating the powder by selective melting. The powder may for example be metallic, plastic or inorganic, for example ceramic.

The method begins with a step of depositing a first layer of powder onto a work surface 40a of a build platform 40. The build platform 40 is mobile translationally along a vertical axis 40b. After deposition, the first layer extends substantially horizontally on the work surface 40*a*. Next, a source of energy 42, for example of the laser type, emits a beam of energy the orientation of which is controlled by galvanometric mirrors (not depicted). An optical lens (not depicted) allows the beam of energy to be focussed so that it heats the layer of powder in a pattern that corresponds to the desired cross section, thus selectively melting the powder.

After the step of melting the first layer deposited, the build platform 40 is lowered by the thickness of this layer and a second layer is deposited to cover the first layer of powder which is partly melted. By way of indication, the thickness of a layer of powder may vary from a few microns, for example 10 μm, to several hundred microns, for example 500 μm. Next, the selective melting of the second layer is performed as before. These steps are repeated once again to form the lining element 10 by the stacking of melted layers.

In the embodiment illustrated, the lining element 10 is manufactured so that it is inclined with respect to the work surface 40*a* of the build platform. A support 44 is formed for this purpose on the work surface 40*a* during the steps of deposition and selective melting of the layers of powder. This support 44 is used only for the manufacture of the lining element 10. The surface 16 of the lining element 10 extends from an inclined upper surface 44*a* of the support 44. Thus, during the method, an intermediate element formed by the support 44 and the lining element 10 is manufactured on the build platform 40.

The injection nozzle 26 is rendered as one with the body 12 and the shut-off member 30 is rendered as one with the said body and with the injection nozzle 26 during the steps of selective melting of the layers of powder. During manufacture, the body 12, the injection nozzle 26 and the shut-off member 30 are produced as a single piece. The supply duct 34 is formed during these steps of deposition and selective melting of the layers of powder.

In order to render the layers of the shut-off member 30 and of the injection nozzle 26 which are in the process of being formed locally as one with one another, a theoretical clearance is provided by modelling between the head 36 of the said shut-off member and the frontal surface 26*b* opposite, belonging to the said nozzle, which clearance is comprised between 0.05 and 0.5 mm, and preferably equal to 0.1 mm. With such a theoretical clearance, the deposited powder locally present between the head 36 and the frontal surface 26*b* is completely or partially melted by the diffusion of heat. This powder that is completely or partially melted by the diffusion of heat is illustrated schematically in FIG. 4 and referenced 46.

Similarly, a modelled theoretical clearance comprised within the same range of values is provided between the base of the shut-off member support rod 38 and the large-diameter cylindrical portion 34*a* of the supply duct so that the deposited powder locally present between this base and this portion is completely or partially melted by the diffusion of heat. This allows the shut-off member 30 and the body 12 to be rendered as one locally. This powder is illustrated schematically in FIG. 5 and referenced 48. These two zones in which some powder is completely or partially melted by the diffusion of heat rather than by direct sintering under the effect of the beam of energy allows the shut-off member 30 to be supported during the manufacture of the lining element 10.

After manufacture, the intermediate element formed by the support 44 and the lining element 10 is detached from the build platform 40, for example by wire cut electrical discharge machining. The lining element 10 can then be detached from the support 44, likewise by wire cut electrical discharge machining. Thereafter, the shut-off member 30 is partially detached from the injection nozzle 26 and from the body 12 by pulling, which may for example be done by hand, so as to be mobile between the positions in which the outlet orifice 26*a* of the said nozzle is closed and open.

FIGS. 6*a* to 6*e* partially illustrate steps in the moulding of a tire P using the lining element 10 which is fixed inside the associated mould (which has not been depicted).

The non-vulcanized green tire P is brought into contact with the moulding surface 14 of the lining element as illustrated in FIGS. 6*a* and 6*b*. The movement of the non-vulcanized green tire towards the moulding surface 14 is illustrated by the arrow referenced 50. During this step of bringing the non-vulcanized into contact with the moulding surface 14, the shut-off member 30 is kept in the position in which the outlet orifice 26*a* of the nozzle is closed by the pressure exerted by the green tire. This makes it possible to prevent the rubber from the green tire from creeping into the supply duct 34. The surface S of the green tire that comes into contact with the moulding surface 14 of the lining element forms part of the rolling surface of the said tire. The injection nozzle 26 extends into the thickness of the rolling of the non-vulcanized green tire P. The nozzle 26 penetrates in a direction that is substantially radial when considering the axis of the green tire. A void 52 of a shape corresponding to the injection nozzle 26 is formed in the thickness of the rolling. This void 52 extends from the rolling surface S.

Next, after the green tire has increased in temperature inside the mould and just before vulcanizing begins, a fluid is injected into the supply duct 34 of the lining element. This injection of fluid is illustrated schematically by the arrow referenced 54 in FIG. 6*c*. Under the effect of the pressure of the injected fluid, the shut-off member 30 switches from the position in which it closes to the position in which it opens the outlet orifice 26*a* of the injection nozzle. Upon the opening of the said orifice, a cavity 56 begins to form within the thickness of the green tire P in the immediate vicinity of the outlet orifice 26*a*. The cavity 56 extends the recess 52 towards the inside of the green tire.

The injection of fluid then continues as illustrated in FIG. 6*d* until the desired size is obtained for the cavity 56, and is then stopped. Once the injection of fluid has stopped, the shut-off member 30 remains in the open position. The green tire P is kept inside the mould until it is fully vulcanized. Next, in a final step, the tire P is extracted from the mould as illustrated schematically by the arrow referenced 58 in FIG. 6*e*.

In the embodiment of the tire moulding method described, the creation of the cavity 56 is obtained by injecting a fluid into the rolling of the tire. The fluid may for example be a gaseous material such as air or even a liquid material such as water. As an alternative, it is possible to provide for an injection of solid material such as a plastic or a rubber different from that of the tire. In the case of such an injection, the cavity created by the injection of solid material is simultaneously filled with the said material.

Figure 7:
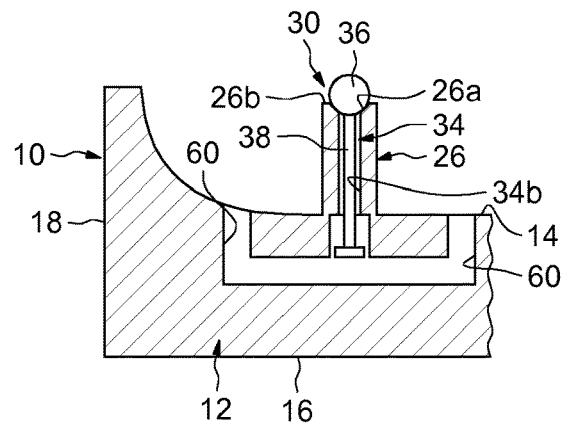

The embodiment of the lining element 10 illustrated in FIG. 7, in which elements that are identical bear the same references, differs from the first embodiment described in that venting passages 60 extend from the moulding surface 14 into the thickness of the body 12. The passages 60 meet within the thickness of the body 12 and communicate with the cylindrical portion 34*b* of the supply duct. The passages 60 are formed during the operations of deposition and selective melting of the layers of powder. In the embodiment illustrated, the passages 60 are two in number. The venting passages 60 make it possible to prevent air from becoming trapped between the moulding surface 14 of the lining element 10 and the green tire during the tire vulcanizing step and allow this air to be reinjected into the thickness of the rolling via the injection nozzle.

In the embodiment illustrated, the supply duct 34 does not have the large-diameter cylindrical portion 34a that allows for connection to an external source for injecting air. Only the reintroduction of the air initially present between the moulding surface 14 of the lining element and the green tire is used to form a cavity beneath the rolling surface of the tire. As an alternative, it may however be possible to maintain the concept of the supply duct 34 from the first embodiment and to provide venting passages extending from the moulding surface 14 of the lining element and opening into the cylindrical portion 34b of the said duct.

Figure 8:
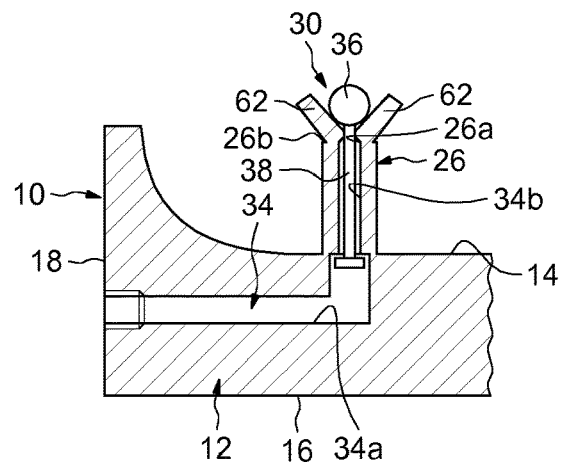

The embodiment illustrated in FIG. 8, in which elements that are identical bear the same references, differs from the first embodiment described only in that the lining element 10 comprises two lugs 62 for supporting the head 36 of the shut-off member. The lugs 62 extend from the frontal surface 26b of the nozzle while being as one with the head 36. The lugs 62 are formed as one with the injection nozzle 26 and with the head 36 of the shut-off member. The lugs 62 are formed during the operations of deposition and selective melting of the layers of powder.

The manufacture of this lining element 10 can be achieved in exactly the same way as the method of manufacture described previously, namely in an inclined manner with respect to the work surface of the associated build platform via the use of an intermediate support. After manufacture, the shut-off member 30 is partially detached from the injection nozzle 26 and from the body 12 by pulling, which may for example be performed by hand, so as to be mobile between the positions in which the outlet orifice 26a of the said nozzle is closed and open. The lugs 62 are used only during the manufacture of the lining element 10 for supporting the shut-off member 30.

Figure 9:
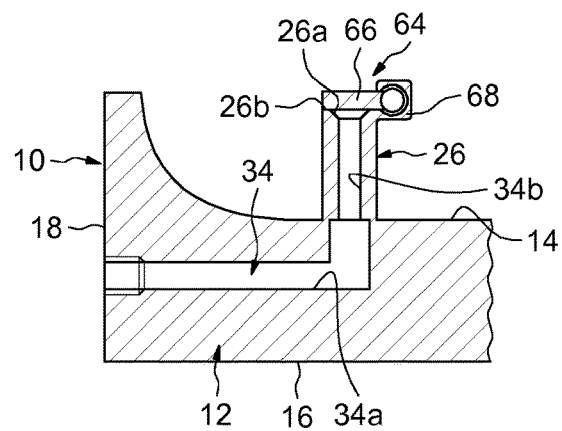

The embodiment illustrated in FIG. 9, in which elements that are identical bear the same references, differs from the first embodiment described only in that the lining element 10 comprises a shut-off member 64 mobile in rotation with respect to the injection nozzle 26 and to the body 12. The shut-off member takes the form of a flap 66 articulated to rotate via a hinge 68 formed on the injection nozzle 26. The flap 66 and the hinge 68 are formed during the operations of deposition and selective melting of the layers of powder. The flap 66 and the hinge 68 are formed as one with the injection nozzle 26. Following manufacture, the flap 66 is detached partially from the nozzle 26 so as to be able to move between the closed position and the open position.

In the embodiments illustrated, each injection nozzle extends out from the moulding surface of the body of the lining element. As an alternative, it might be possible, alternatively or in combination, to provide at least one nozzle extending out from a free frontal surface of one of the protuberances intended for moulding cuts in the rolling of the tire.

In the exemplary embodiments illustrated, each injection nozzle is produced as one piece with the body of the lining element. As an alternative, it may be possible to provide an injection nozzle that is still manufactured simultaneously with the body and the shut-off member during the operations of deposition and selective melting of the stacked layers of powder but which is rendered mobile after manufacture between a retracted position inside the body and a deployed position in which it projects out with respect to the moulding surface of the said body.

The invention claimed is:

1. Liming element for a tire mould comprising a body delimiting a moulding surface configured to at least partially mould a rolling surface of the tire, wherein the lining element further comprises at least one injection nozzle arranged on the body and provided with at least one outlet orifice at least one supply duct extending inside the body and the injection nozzle while being in communication with the said outlet orifice, and at least one shut-off member mobile with respect to the injection nozzle between an outlet orifice closed position and an outlet orifice open position, the body, the injection nozzle and the shut-off member being manufactured by the deposition and selective melting of stacked layers of powder.

2. The lining element according to claim 1, wherein the injection nozzle is made in one part with the body and projects out with respect to the moulding surface of the said body.

3. The lining element according to claim 1, wherein the shut-off member is mobile from the closed position to the open position under the effect of the pressure of a fluid or of a solid introduced into the supply duct.

4. The lining element according to claim 1, wherein the outlet orifice opens onto a frontal surface of the injection nozzle substantially parallel to the moulding surface of the body.

5. The lining element according to claim 1, wherein the supply duct comprises means of connection to a supply source external to said element.

6. The lining element according to claim 1, wherein the shut-off member is mobile in translation with respect to the injection nozzle.

7. The lining element according to claim 6, wherein the shut-off member comprises a piston provided with a rod mounted inside the supply duct and with a shut-off head able to shut off the said outlet orifice in the closed position.

8. The lining element according to claim 1, wherein the shut-off member is rotationally mobile with respect to the injection nozzle.

9. The lining element according to claim 8, wherein the shut-off member comprises a flap that comes to bear against a frontal surface of the injection nozzle substantially parallel to the moulding surface of the body in the body closed position.

10. The lining element according to claim 1, wherein the body comprises venting means extending from the moulding surface and configured to allow air to be evacuated while the tire is being moulded, said venting means being in communication with the supply duct.

11. The lining element according to claim 1, comprising a plurality of protuberances extending outcuts from the moulding surface of the body and adapted to mould cuts in the tread of the tire.

12. The lining element according to claim 11, wherein the injection nozzle extends out from a free frontal surface of one of the said protuberances.

13. The lining element according to claim 1, wherein the injection nozzle extends out from the moulding surface of said body.

14. Mould for a tire of the type comprising a tread and two lateral sidewalls, the mould comprising first and second shells which are adapted to mould the lateral sidewalls of the tire, and a plurality of segments distributed in the circumferential direction and adapted to mould the tread of the said tire, each segment comprising at least one lining element according to claim 1.

15. Method of manufacturing the lining element according to claim 1, the lining element comprising a body delimiting a moulding surface adapted to at least partially mould a rolling surface of the tire, comprising the following steps:

a) manufacture, by deposition and selective melting of stacked layers of powder, of the body of the lining element, of at least one injection nozzle arranged on the said body and provided with at least one outlet orifice, and of a shut-off member for shutting off the said outlet orifice, the injection nozzle being rendered as one with the body and the shut-off member being rendered as one with at least the said nozzle during the steps of selective melting of the layers of powder, b) at least partial formation of at least one supply duct extending inside the body and the injection nozzle and being in communication with the outlet orifice of the said nozzle during the steps of deposition and selective melting of the layers of powder, and c) partial separation of the shut-off member and of the injection nozzle after the steps of deposition and selective melting of the layers of powder so as to give the shut-off member mobility between positions in which the outlet orifice of the injection nozzle is closed and open.

16. The method according to claim 15, wherein, according to a modelled melting of the layers of powder, a clearance is provided between part of the shut-off member and a facing part of the injection nozzle, which clearance is comprised between 0.05 and 0.5 mm, so that the deposited powder present between the said facing parts is completely or partially melted by the diffusion of heat locally rendering the shut-off member and the injection nozzle as one.

17. The method according to claim 15, wherein the shut-off member comprises a piston provided with a rod mounted inside the supply duct and with a shut-off head, and wherein the body of the lining element is manufactured in such a way as to extend in an inclined fashion with respect to a build platform on which a first layer of powder is deposited and melted.

18. Method of moulding a tire according to the mold of claim 14 comprising first and second shells adapted to mould the lateral sidewalls of tire, and a plurality of segments distributed in the circumferential direction and adapted to mould the tread of said tire, in which method the non-vulcanized green tire that is to be moulded is brought into contact with the shells and the segments of the mould, the green tire is heated, and then a fluid or a solid is injected under the exterior surface of the green tire which is in contact with the mould and which is adapted to form the rolling surface of the tire so as to create at least one cavity in the thickness of the green tire and beneath said rolling surface.

* * * * *